INVENTORS
David C. Yoder,
John H. Searcy
BY
ATTORNEY

July 27, 1965 D. C. YODER ETAL 3,197,565
LOW-LEVEL MULTIPLEX SYSTEM WITH INDEPENDENTLY VARIABLE GAIN ON EACH CHANNEL
Filed Sept. 25, 1961 2 Sheets-Sheet 2

INVENTORS
David C. Yoder,
John H. Searcy
BY George N. Robillard
ATTORNEY 3,197,565

LOW-LEVEL MULTIPLEX SYSTEM WITH INDEPENDENTLY VARIABLE GAIN ON EACH CHANNEL

David C. Yoder and John H. Searcy, both of Fort Lauderdale, Fla., assignors to Systems Engineering Laboratories, Inc., Fort Lauderdale, Fla., a corporation of Florida Filed Sept. 25, 1961, Ser. No. 140,470
13 Claims. (Cl. 179—15)

The present invention relates generally to multiplex systems, and more particularly to a time division multiplex system adapted to handle low-level signals.

In the past, attempts to multiplex low-level signals, such as are generated by thermocouples or other similar transducers have not been completely satisfactory because of loss in intelligence between the input terminal of the channels and the common output of the system. Particular problems which occur are, for example, the D.C. drift associated with the necessary amplifying elements and the influence of a common voltage upon the differential signal (common mode error). For low signal levels, the drift amplitude introduced is frequently of the same order of magnitude as the information signals. Drift and common mode errors are greatly reduced by the use of transformer coupling. Transformer coupling, however, is objectionable due to microphonics induced by low frequency mechanical disturbances and distortion introduced by saturation resulting from energy storage of a particular polarity. Saturation can also be objectionable since channel-to-channel cross talk results, this being another form of signal degradation.

Many of these problems are overcome, as for example, the elimination of D.C. drift by the use of a prior art circuit of the type appearing on pages 55 and following of the July 1, 1960, issue of Electronics magazine which is entitled "Transistorized Data Amplifier Has High Gain-Stability." In this article there is disclosed a single channel amplifier (FIGURE 1) wherein a direct coupled transistor amplifier A with transformer-coupled chopper input B and output C circuits is utilized. The amplifier is of the A.-C. type. This system operates in the same manner as the circuit to be discussed in connection with FIGURES 2 and 3. The circuit also utilizes a single secondary winding D and center-tapped capacitors $C_1$ and $C_2$. On the first half of the cycle the capacitor $C_1$ is charged to the voltage of the first half of the first wave. On the second half of the cycle $C_2$ is charged to the voltage of the second half of the first wave. Thus, after one complete cycle the output is the top to bottom voltage across the capacitors. The output rises after a single cycle to its full value. In this manner a D.C. input signal can be converted by a switching mechanism to an alternating signal and thereby eliminate the necessity of a D.C. amplifier. This directly eliminates the problems of drift which are inherent in the D.C. amplifier systems.

The prior art has also suggested that the problem of D.C. drift in a time division multiplex system can be overcome by plus-minus sampling in which the commutator reverses the polarity of the connections on alternate contacts with each individual channel. This is discussed at page 96 of "Radio Telemetry" by Nichols and Rauch, John Wiley & Sons, 1956.

Low-level multiplexers of the above type suffer from the inherent problem that all the channels on the single A.-C. amplifier are forced to share a common gain or scale factor. That is, the gain for each of the channels of the multiplex unit will be the same. Therefore, if different ones of the channels transmit to the multiplexing units at a different voltage intensity level, the output will also be at a different inensity level for each of the channels, thereby increasing the probability of losing information.

In accordance with this invention this problem is overcome by enabling completely independent gain settings to be applied to the amplifier for each channel of the multiplexer. By using an A.-C. coupled amplifier in the multiplexer, independent gain adjustments for each channel can be accomplished simply by switching an appropriate feedback network into the circuit for each channel. The A.-C. coupling allows this to be accomplished with a minimum effect on amplifier transient response since only the A.-C. gain is changed, the D.C. levels remaining unchanged for the various channels.

It is an object of this invention to provide a low-level multiplexer wherein the gain or scale factor of each channel thereof can be independently varied.

This object and still further objects and advantages of the present invention will become apparent to those skilled in the art upon consideration of the following detailed description of a specific embodiment thereof, especially when taken into conjunction with the accompanying drawings wherein.

Figure 2:
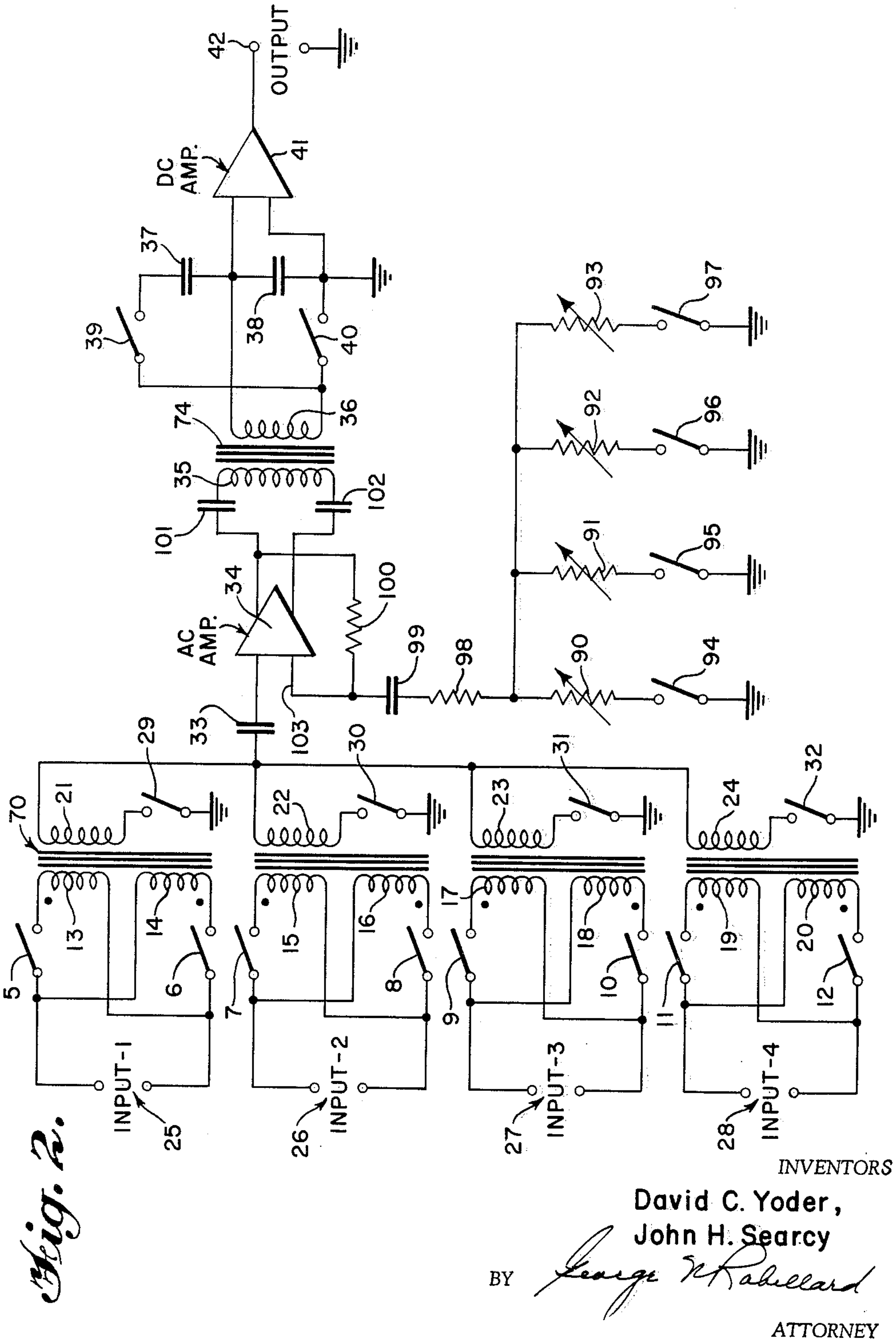
FIGURE 2 is a schematic diagram of the preferred embodiment of the invention.

In FIGURE 2, the schematic diagram of the preferred form of the invention, there are shown four identical signal channels 25, 26, 27 and 28 each of which is connected to a low-level input signal source designated as inputs 1, 2, 3 and 4, respectively. The input signal sources 1, 2, 3 and 4 may be thermocouples or similar low-level signal producing means. Each channel is connected to two single-pole, single-throw switches, such as 5 and 6 in channel 25, 7 and 8 in channel 26, 9 and 10 in channel 27 and 11 and 12 in channel 28.

The input signal path in the channel 25 can be traced from the input 1 through the switch 5, through the primary winding 13 of the transformer 70 and back to second line of the input source. A second circuit path can be traced from the first line of the input 1 through the primary winding 14 of transformer 70 to the switch 6 and back to the second wire of the input 1. The primary windings 13 and 14 are wound in opposition to each other. The single-pole switches 5 and 6 are singularly activated to cause signal current flow alternately into one and then the other of the primary windings 13 and 14.

Channels 26, 27 and 28 respectively, operate in the same manner by means of the switches 7 and 8 and the primary windings 15 and 16 in channel 26, by means of the switches 9 and 10 and the primary windings 17 and 18 in channel 27 and by means of the switches 11 and 12 and the primary windings 19 and 20 in channel 28. The switches 5, 6; 7, 8; 9, 10; and 11, 12 are sequentially operated by a suitable device (not shown).

The polarity of the primary windings 13, 14; 15, 16; 17, 18; and 19, 20 are such that a flux reversal occurs whenever the second of each of these pairs of windings is energized causing an alternating signal to appear in the secondary windings 21, 22, 23 and 24 of the transformers. These signals in the secondary windings are coupled to a common A.-C. amplifier 34 through a coupling capacitor 33 by the closure of switches 29, 30, 31 and 32, each of said switches coupling one portion of the secondary windings to ground upon closure thereof. The signals from the secondary windings, which are alternating, are transferred through the coupling capacitor 33 to the input terminal of the A.-C. coupled amplifier 34 which amplifies the signals from a low-level to a high-level value. The use of an A.-C. rather than a D.C. amplifier with a modulated common time division multiplex signal of low-level is entirely advantageous because there is a minimum of drift associated therewith.

The resistors 90, 91, 92 and 93 form part of an overall feedback network from the output of the amplifier 34 to one side of the differential input 103. For a D.C. input to the amplifier, resistor 100 which is coupled between the output terminal of the amplifier and the input terminal 103 is the only feedback network and essentially provides unity feedback, thus producing a gain of one at D.C. The switches 94, 95, 96 and 97 are coupled to ground at one end thereof and to the variable resistors 90, 91, 92 and 93, respectively at their other end. Each switch is operated concurrently with its associated channel. That is, the switch 94 is closed concurrently with the switch 29. Similarly, the switch 95 is closed concurrently with switch 30; switch 96 is closed concurrently with switch 31; and switch 97 is closed concurrently with switch 32. The resistors 90, 91, 92 and 93 can be adjusted in their value to vary their common gain or scale factor of the channel with which they are associated. The resistors 90 to 93 are coupled to the terminal 103 through serially connected resistor 98 and capacitor 99.

Thus, when the input channel 25 is in operation, the switch 94 will be closed and the gain of this channel will be given the equation $$G=\frac{A}{1+A\left(\frac{R_2+R_3+R}{R_1+R_2+R_3+R}\right)}$$

where $A$= the open loop gain of the amplifier
$R$=the saturation resistance of the switch 94
$R_3$=the resistance of the resistors 90, 91, 92 or 93
$R_2$=the resistance of the resistor 98
$R_1$=the resistance of the resistor 100.

The capacitor 99 acts as a blocking capacitor for the D.C. current components so that the resistance presented to the circuit by the resistors 98, 90, 91, 92 and 93 is only presented to the A.-C. components of the current.

The output signal from the A.-C. amplifier 34 is applied to the primary winding 35 of the transformer 74 through the capacitors 101 and 102. This signal is transferred to the secondary winding 36 of the transformer and is thereby switched alternately across the capacitors 37 and 38 at times to coincide with the switching action of the input switches (such as 5, 6, respectively). This switching is accomplished by means of alternate closure switches 39 and 40 in synchronism with the switches 5 and 6. These capacitors function as a holding or storage device for the peak A.-C. signals applied thereto.

Accordingly, switches 39 and 40 and capacitors 37 and 38 serve as a synchronous rectifier for the A.-C. signal applied thereto. The output voltage obtained across capacitors 37 and 38 is applied to a D.C. amplifier 41, the output of which is a time division multiplex signal of the input signals which have been amplified with a minimum of distortion, drift or noise. The amplifier 41 is of standard design having high input impedance and low output impedance to enhance matching with a suitable load.

Figure 1:
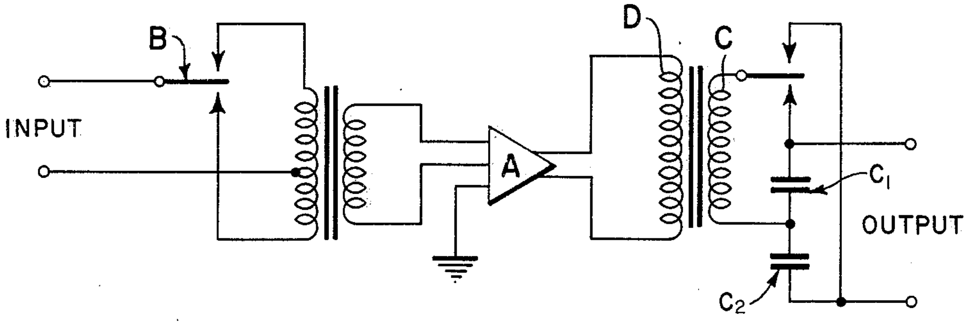
FIGURE 1 is a schematic diagram of the above-mentioned prior art system.
Figure 3:
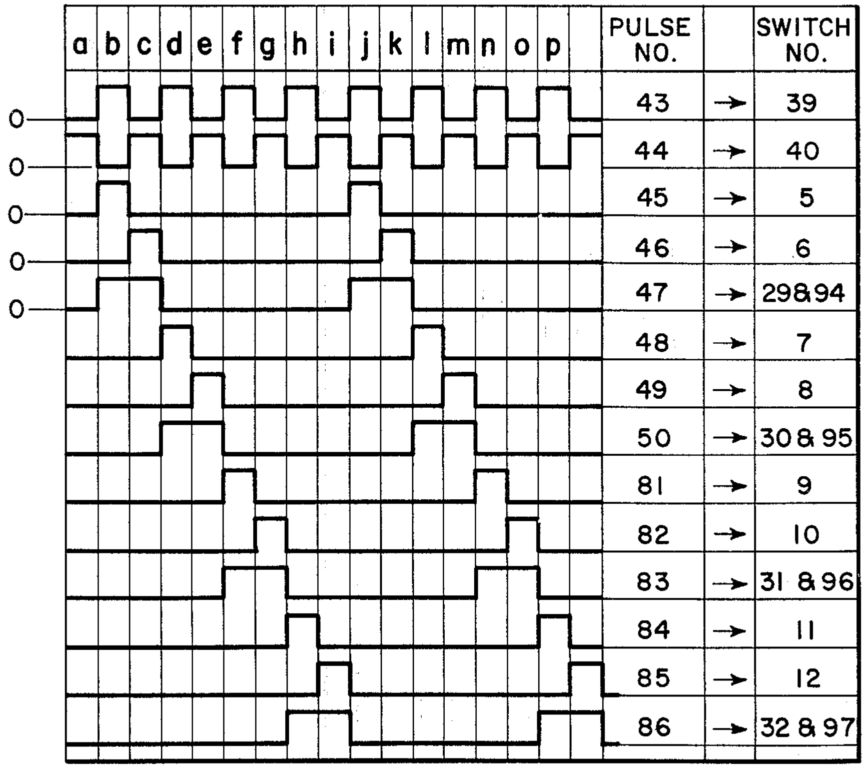
FIGURE 3 is a timing diagram of the preferred embodiment of the invention.

The operation of the system disclosed in FIGURE 2 is best understood by reference to the timing diagram illustrated in FIGURE 3.

FIGURE 3 discloses a timing diagram of which includes a plurality of rectangular signal pulses 43 through 50, and 81 through 86. A positive going signal pulse in the timing diagram will indicate the closure of the switch associated therewith as indicated in FIGURE 3. The above mentioned signals are associated with switches 39, 40, 5, 6, 29, 7, 8, 30, 9, 10, 31, 11, 12, and 32, respectively.

Reference to FIGURE 3 discloses that in the time period *b* the signal 43 is positive, thereby indicating the closure of switch 39. Also, the signals 45 and 47 are positive, thereby indicating the closure of switches 5, 94 and 29. During this time period input signal pulse will travel through the switch 5 and the primary windings 13 and back to the second terminal of the input 1. A signal pulse will thereby be placed on the secondary winding 21 of the transformer 70, the secondary winding having been connected to ground the switch 29. This signal travels through the coupling acapictor 33 to the A.-C. amplifier 34 wherein it is amplified and transferred to the primary winding 35 of the transformer 74.

This signal will also be fed back from the output terminal of the amplifier 34 through the resistor 100 to the terminal 103 of the amplifier. Since the gain of the amplifier will be determined by the formula supra thereby making the gain of the amplifier dependent upon the value of the appropriate resistor 90 to 93 for each channel, an adjustment of the resistor 90 to 93 will determine the gain of the amplifier for each channel.

It can, therefore, be seen that during the time periods *b* and *c* the switch 94 will be closed causing the amplifier to have a predetermined gain which is matched to the signal intensity of channel 25. Similarly, during the periods *d* and *e* the switch 95 will be closed; during the time periods *f* and *g* the switch 96 will be closed and during the time period *h* and *i* the switch 97 will be closed. In this manner, the gain of the amplifier is matched for each channel.

The signal at the primary winding 35 will be passed to the secondary winding 36 and charge the capacitor 37, the switch 39 having been closed, during time period *b*.

During the time interval *c* the switches 40, 6, 94 and 29 will be closed, the remaining switches being held open. Accordingly, an input signal will travel from the input 1 to the primary winding 14 and then through the switch 6 and back to the second terminal of the input 1. This signal will be of opposite polarity to the signal of the input of the transformer 70 during the time period *b*. The signal is transferred to the secondary winding 21, one terminal of which has been coupled to the ground through the switch 29, the signal passing through the coupling capacitor 33 to the A.C. amplifier 34 and thence to the primary winding 35 of the transformer 74. The signal is then transferred to each of the secondary winding 36 and charges the capacitor 38 through the closed switch 40. It should be noted that in time period *c* the voltage across the secondary winding 36 will be of opposite polarity to the voltage across the winding 36 during time interval *b*. Therefore, the capacitor 38 will be charged in a direction opposite to that of capacitor 37. Accordingly, the voltage across the sum of the two capacitors will be the difference of the two input voltage signals in the time intervals *b* and *c*. This difference voltage is then transferred through the D.C. amplifier 41 to the output terminal 42.

Similarly, during the remaining time periods as set forth in FIGURE 2 the remaining switches will be synchronously opened and closed thereby producing a time division multiplex output signal at the output terminal 42.

It should be understood that though the switches 5 to 12, 29 to 32, 39, 40, and 94 to 97 have been described as single pole, single throw switches, these switches could be, for example, transistors acting as switches wherein the transistors are rendered conductive by a timing pulse on the control electrode thereof during the time periods indicated in FIGURE 3 in which the switches are closed. A typical set of transistor switches which can be used with this invention is set forth in copending application Serial No. 203,834, filed on June 20, 1962 by John H. Searcy.

It should be understood that the switching rate of the switches at the input terminals will be somewhat greater than the frequency of the changes in voltage level at the input terminals in order that the magnitude of the positive and negative waves will be substantially the same.

Though the invention has been described with respect to specific embodiments, many variations will be obvious to those skilled in the art. Accordingly, it is the intention to be limited only as indicated by the scope of the appended claims which are to be interpreted as broadly as possible in view of the prior art.

What is claimed is:

1. A multiplex system comprising a plurality of signal channels each adapted to be coupled to a low level D.C. signal source and each including means to convert a D.C. signal to a corresponding alternating signal, an A.C. amplifier means, means coupling the alternating signal outputs from said signal channels in common to the input of said A.C. amplifier means, a feed-back impedance coupling the output of said A.C. amplifier means with the input to said A.C. amplifier means, a gain control means coupled to the input of said A.C. amplifier means and a point of reference potential, switch means for sequentially coupling said channels with said A.C. amplifier means, and means operating said gain control means to set the gain of said A.C. amplifier means in synchronism with said switch means.

2. A multiplex system comprising a plurality of signal channels each adapted to be coupled to a low level D.C. signal source and each including means to convert a D.C. signal to a corresponding alternating signal, an A.C. amplifier means, means coupling the alternating signal outputs from said signal channels in common to a first input to said A.C. amplifier means, a feedback impedance coupling the output of said A.C. amplifier means with the input of said A.C. amplifier means, a plurality of gain control means coupled in common on one side to the input of said A.C. amplifier means and each coupled on its other side to a point of reference potential, switch means for sequentially coupling said channels with said A.C. amplifier means, and means operating said gain control means to set the gain of said A.C. amplifier means in synchronism with said switch means.

3. A multiplex system according to claim 2 wherein each gain control means is comprised of an impedance and a switch connected in series.

4. A multiplex system comprising a plurality of signal channels each adapted to be coupled to a low level D.C. signal source and each including means to convert a D.C. signal to a corresponding alternating signal, an A.C. amplifier means, means coupling the alternating signal outputs from said signal channels in common to a first input to said A.C. amplifier means, a feedback impedance coupling the output to said A.C. amplifier means with the input of said A.C. amplifier means, a plurality of gain control means coupled in common on one side to the input of said A.C. amplifier means and a point of reference potential, each said gain control means associated with a signal channel and comprised of an impedance, rectifier means coupled to the output of said A.C. amplifier means, and switch means for sequentially coupling said channels and associated gain control means with said A.C. amplifier means.

5. A multiplex system according to claim 4 wherein said impedances are resistances.

6. A multiplex system according to claim 4 wherein each said gain control means is comprised of a variable impedance.

7. A multiplex system comprising a plurality of signal channels each including transformer means and first switch means coupled to convert a D.C. signal to an A.C. signal, second switch means serially connected with the secondary of each transformer means, means coupling one side of the secondary of each transformer means to a point of reference potential, an A.C. amplifier, means coupling the outputs of said transformer means in common to a first input of said amplifier, a feedback impedance coupled from the output of said amplifier to a differential input to said amplifier, a gain control networks coupled on one side to the differential input to said amplifier and coupled on the other side to a point of reference potential, rectifier means for rectifying A.C. signals to D.C. coupled to the output of the A.C. amplifier, and means for operating said second switch means for sequentially coupling said signal channels with said A.C. amplifier, and means operating said gain control means to set the gain of said A.C. amplifier in synchronism with said second switch means.

8. A multiplex system comprising a plurality of signal channels each including transformer means and first switch means coupled to convert a D.C. signal to an A.C. signal, second switch means connected with the secondary of each transformer means, means coupling one side of the secondary of each transformer means to a point of reference potential, an A.C. amplifier, means coupling the outputs of said transformer means in common to a first input of said amplifier, a feedback impedance coupled from the output of said amplifier to a differential input to said amplifier, a plurality of gain control networks coupled in common on one side to the differential input to said amplifier and each coupled on its other side to a point of reference potential, each said gain control network associated with a signal channel and comprised of a series combination of an impedance and a third switch means, and means for operating said second and said third switch means for sequentially coupling said signal channels and associated gain control networks with said A.C. amplifier.

9. A multiplex system according to claim 8 wherein the output of said A.C. amplifier is coupled to a rectifier means and a D.C. amplifier is coupled to the output of said rectifier means.

10. A multiplex system according to claim 8 wherein the impedance of each said gain control network is a variable resistance.

11. A multiplex system comprising a plurality of signal channels each including a transformer having a pair of cross coupled primaries and a secondary, a first switch serially connected with each primary to be operated to convert D.C. signals to A.C. signals, a second switch serially connected with each secondary, a plurality of low level D.C. signal generating sources each coupled to the cross coupled primaries of a signal channel, means coupling one side of each secondary and second switch combination to a point of reference potential, an A.C. amplifier, means coupling the other sides of said secondary and second switch combinations in common to a first input of said amplifier, a feedback impedance coupled from the output of said amplifier to a differential input to said amplifier, a plurality of gain control networks coupled in common on one side to the differential input to said amplifier and each coupled on its other side to a point of reference potential, each said gain control network associated with a signal channel and comprised of an impedance and a third switch coupled in series, and means for operating said second and said third switches for sequentially coupling said signal channels and associated gain control networks with said A.C. amplifier.

12. A multiplex system comprising a plurality of signal channels each including a transformer having a pair of cross coupled primaries and a secondary, a first switch serially connected with each primary to be operated to convert D.C. signals to A.C. signals, a second switch serially connected with each secondary, a plurality of low level D.C. signal generating sources each coupled to the cross coupled primaries of a signal channel, means coupling one side of each secondary and second switch combination to a point of reference potential, an A.C. amplifier, means coupling the other sides of said secondary and said second switch combinations in common to a first input of said amplifier, a feedback impedance coupled from the output of said amplifier to a differential input to said amplifier, a plurality of gain control networks coupled in common on one side to the differential input to said amplifier and each coupled on its other side to a point of reference potential, each said gain control network associated with a signal channel and comprised of an impedance and a third switch coupled in series, rectifier means for rectifying A.C. signals to D.C. coupled to the output of the A.C. amplifier, a D.C. amplifier coupled to said rectifier means, and means for operating said second and said third switches for sequentially coupling said signal channels and associated gain control networks with said A.C. amplifier.

13. A multiplex system according to claim 12 wherein the impedance of each said gain control network is a variable resistance.

References Cited by the Examiner

UNITED STATES PATENTS 2,757,283 7/56 Ingerson et al. ---------- 348—147

DAVID G. REDINBAUGH, *Primary Examiner.*